United States Patent [19]

Beckman et al.

[11] 4,360,143

[45] Nov. 23, 1982

[54] METHOD FOR MANUFACTURING SUSPENSION MEMBERS

[75] Inventors: John A. Beckman, Denver; Ronald A. Rinehart, Ephrata; Dennis L. Hammond, Reading, all of Pa.

[73] Assignee: Dana Corporation, Toledo, Ohio

[21] Appl. No.: 119,427

[22] Filed: Feb. 7, 1980

[51] Int. Cl.³ .............................................. B23K 31/00
[52] U.S. Cl. ...................................... 228/155; 29/445; 228/173 F
[58] Field of Search ............................. 228/155–158, 228/173 F, 175, 141.1, 176; 29/404, 445, DIG. 48, DIG. 49; 280/785, 781

[56] References Cited

U.S. PATENT DOCUMENTS

| 1,884,689 | 10/1932 | Hilpert | 29/404 |
| 1,992,710 | 2/1935 | Matthaei | 228/155 X |
| 3,101,272 | 8/1963 | Setzer | 280/781 X |
| 3,117,369 | 1/1964 | Albert | 228/155 X |
| 3,210,837 | 10/1965 | Hassellof | 29/404 |
| 3,282,748 | 11/1966 | Martens | 228/155 X |
| 3,547,463 | 12/1970 | Eggert, Jr. | 280/784 |
| 3,966,260 | 6/1976 | Braun | 301/127 |

Primary Examiner—R. L. Spruill
Assistant Examiner—J. Reed Batten, Jr.
Attorney, Agent, or Firm—Emch, Schaffer & Schaub

[57] ABSTRACT

An improved method is disclosed for manufacturing suspension members for use in a vehicle suspension system. The suspension member is formed and subjected to prestressing forces at least as great as the expected maximum forces to which the suspension members will be subjected during operation of the vehicle in which they are mounted.

3 Claims, 2 Drawing Figures

METHOD FOR MANUFACTURING SUSPENSION MEMBERS

BACKGROUND OF THE INVENTION

The present invention is directed to welded suspension members used in vehicle suspension systems, such as stamped and welded vehicle frames, structures and swing arms, and particularly to an improved method for manufacturing such suspension members.

Suspension members used in vehicle suspension systems are often manufactured from sheet metal stampings which are welded together. For example, vehicle frames are sometimes formed from left and right siderails which are formed from welded channels. The siderails are interconnected by cross members which are welded to the siderails. Swing arms used in independent wheel suspension systems for vehicles are another type of suspension member sometimes formed from stamped and welded steel or only from stamped steel. The swing arm has one end which is pivotally attached to the vehicle frame and a second end on which a wheel is mounted. Any bending or deflection of suspension members such as a vehicle frame or a swing arm may adversely affect wheel alignment for the vehicle. Impulse forces on the wheels, such as occur when the wheels strike an object or drop into a hole while the vehicle is moving, are transmitted to the suspension members. For new vehicles having suspension members formed from stamped and welded steel, these forces may cause plastic deformation of the suspension members, even though the forces are within design limits. The deformation occurs at the high stress areas in the suspension members. As the suspension members yield plastically, the metal is cold worked, the yield point increases, and the metal becomes increasingly resistant to further deformation. As a consequence of the plastic deformation of suspension members in new vehicles, wheel misalignment may occur in vehicles having stamped and welded suspension members after the vehicles are driven only a short distance.

SUMMARY OF THE INVENTION

According to the present invention, an improved method is provided for manufacturing suspension members for use in vehicle suspension systems. Suspension members manufactured in accordance with the method are less susceptible to misalignment problems after the suspension members are installed and operated in a vehicle, even though the suspension members may be subjected to high impulse loads.

According to the present invention, the suspension members are formed by stamping and welding steel in a conventional manner. The stamped and welded members then are prestressed by subjecting such members to a load or force at least as great as the maximum load to which the members may be subjected during operation of the vehicle. During prestressing, the members yield or are subject to plastic deformation at their weakest points, namely, the highest stressed areas. As the metal deforms, it is hardened by cold working. This increases the yield point at the high stress areas so that substantially no further deformation will take place as long as the suspension member is subjected to forces no greater than those applied when the member is prestressed. If desired, the suspension member may be subjected to several repetitive applications of the prestressing forces to assure that no further deformation will occur after the suspension member is installed in a vehicle. Generally, substantially all of the plastic deformation will occur during the first application of the prestressing force. The suspension member then is installed in a vehicle and the vehicle wheels are aligned in a conventional manner. When the vehicle is subsequently operated and the suspension members are subjected to impulse forces or loading as the wheels strike road hazards, the wheels maintain their alignment since the suspension members have already been deformed under design load conditions.

Accordingly, it is an object of the invention to provide an improved method for manufacturing suspension members for use in an alignable vehicle suspension system.

Other objects and advantages of the invention will become apparent from the following detailed description, with reference being made to the accompanying drawings.

DESCRIPTION OF THE PREFERRED EMBODIMENTS

Figure 1:
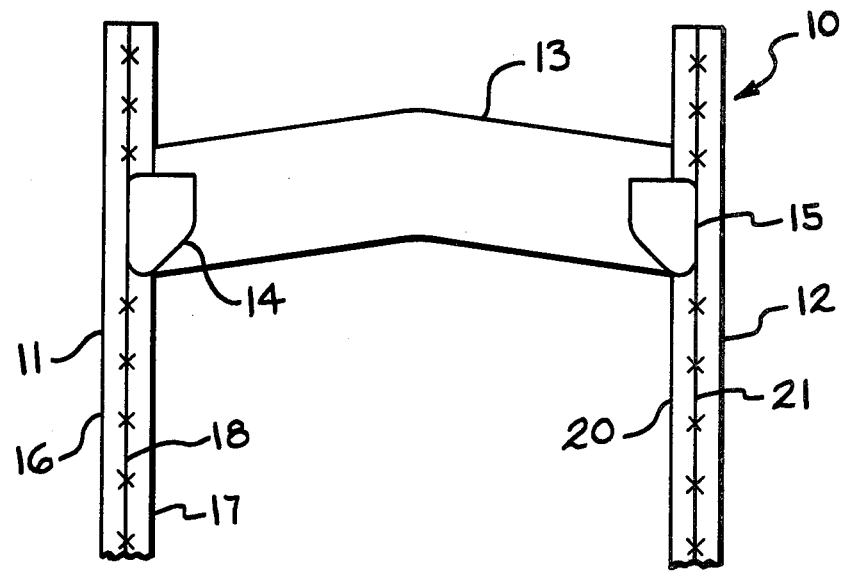
FIG. 1 is a fragmentary diagrammatic top plan view of the front portion of a vehicle frame constructed in accordance with the present invention.
Figure 2:
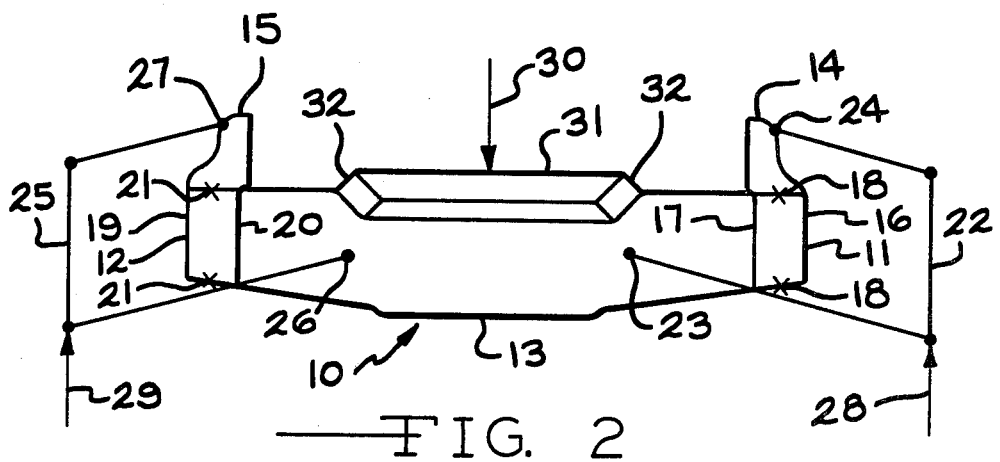
FIG. 2 is a front elevational view of the vehicle frame of FIG. 1 showing the method by which the frame is prestressed prior to installation in a vehicle.

Turning now to the drawings and particularly to FIGS. 1 and 2, a fragmentary portion of a vehicle suspension member in the form of the front portion of one type of vehicle frame 10 is illustrated in diagrammatic form. The illustrated portion of the frame 10 includes a left siderail 11, a right siderail 12, a crossmember 13, a left upper control arm bracket 14 and a right upper control arm bracket 15. The left siderail 11 is formed from an outer rail 16 and an inner rail 17 which are welded together along a seam 18. Similarly, the right siderail 12 is formed from an outer rail 19 and an inner rail 20 which are welded together along a seam 21. The illustrated crossmember 13 is permanently attached to the siderails 11 and 12 by welding. The left upper control arm bracket 14 is welded to the left siderail 11 and may overlap and be welded to the crossmember 13. The right upper control arm bracket 15 is welded to the right siderail 12 and also may overlap and be welded to the crossmember 13. When the frame 10 is installed in a vehicle (not shown), the front wheels are attached to the brackets 14 and 15, the siderails 11 and 12 and the crossmember 13 in a conventional manner. If desired, additional mounting brackets may be welded onto the frame 10. The frame 10 illustrated in the drawings is a diagrammatic representation of a front portion of a vehicle frame formed by stamping and welding steel. The ultimate shape of a vehicle frame or other vehicle suspension member will depend upon various design criteria including the size and shape of the vehicle engine, the size and shape of the vehicle body mounted on the frame and the manner in which the vehicle wheels are attached to the frame.

Turning now to FIG. 2, the method for prestressing the stamped and welded vehicle frame 10 is illustrated. A left fixture or frame or simulated suspension system 22 is illustrated attached between a point 23 on the crossmember 13 and a point 24 on the left upper control arm bracket 14. Similarly, a right fixture or frame or simulated suspension system 25 is illustrated attached between a point 26 on the cross member 13 and a point 27 on the right upper control arm bracket 15. The vehicle frame 10 is supported at points illustrated by an arrow 28 on the fixture 22 and by an arrow 29 on the fixture 25. At the same time, a downward force, indicated by an arrow 30, is applied through a member 31 to fixture or simulated engine mounting brackets 32. The forces acting on the frame 10, as indicated by the arrows 28, 29 and 30, stress the crossmember 13, the siderails 11 and 12 and the upper control arm brackets 14 and 15 in a manner in which they are stressed during operation of a vehicle in which the frame 10 is installed. The forces applied to the frame 10 are of a magnitude sufficient to plastically yield the frame at its weakest points, namely, the high stress areas. This yielding or deformation of the frame increases the yield point of the high stress areas by cold working the metal. The frame 10 may be subjected to a single application of the prestressing force or to several repetitive applications of the force. Each successive application of the prestressing force may further slightly deform the suspension member. Sufficient force is applied to subject the frame 10 to at least the maximum load to which the frame 10 will encounter during operation in a vehicle. As a consequence, the frame 10 is subjected to limited plastic deformation prior to installation in the vehicle, thereby increasing its strength and resistance to further deformation when subjected to forces less than the forces with which the frame is prestressed.

After the frame 10 is prestressed and any remaining manufacturing steps such as painting are completed, it is installed in a vehicle in a conventional manner and wheels are attached to the frame 10 through the use of conventional brackets, such as steering knuckles, control arms, etc., and then are aligned. During subsequent operation of the vehicle, the wheels will maintain an accurate alignment as long as the frame 10 is not subjected to forces or loading greater than the prestressing applied to the frame 10 prior to installation in the vehicle. This is an improvement over prior art vehicle frames and other suspension members which were not prestressed. Such prior art suspension members tend to deform plastically during initial operation of the vehicle when the vehicle wheel strikes road hazards, such as stones and potholes. Plastic deformation or yielding of the prior art suspension member in turn results in misalignment of the wheels. If the wheels are not promptly realigned, the life of the tires is greatly reduced.

In most vehicle suspension members, the deformation accurring during operation of the vehicle is caused by vertically directed forces. However, horizontally or laterally directed forces may also cause deformation and subsequent misalignment of the vehicle suspension. Therefore, prestressing of suspension members only in a vertical direction may not be effective to prevent plastic deformation or yielding in the suspension members when they are subsequently operated in a vehicle and therefore a plurality of loadings and directions may be desired. In many prior art suspension members, the plastic deformation which causes the vehicle wheels to go out of alignment is confined to specific high stress areas. This deformation can be eliminated by prestressing the suspension members in those high stress areas to loads anticipated by the suspension. It also should be appreciated that individual components of a suspension member may be prestressed in selected high stress areas prior to assembly. For example, the siderails and cross members of a vehicle frame may be prestressed in selected areas or along their length prior to welding or bolting these components together to form the vehicle frame.

It will be appreciated that various modifications and changes may be made in the above-described preferred embodiment of the invention without departing from the scope and the spirit of the following claims.

We claim:

1. An improved method for manufacturing a suspension member for use in a vehicle suspension system, said suspension member being subjected to maximum forces during operation of the vehicle, said method comprising the steps of: forming said suspension member from metal, said suspension member having a predetermined plastic deformation in high stress areas when subjected to said maximum operating forces, and prestressing said suspension member before operating the vehicle by subjecting said high stress areas of said suspension member to at least said maximum forces to yield said suspension member in said high stress areas, said yielding of said suspension member results in cold working said high stress areas of said suspension member to increase the yield point of said high stress areas to substantially eliminate subsequent yielding of said suspension member when said suspension member is subjected to said maximum operating forces during the operation of said vehicle.

2. An improved method for manufacturing a suspension member, as set forth in claim 1, wherein said suspension member is initially formed by stamping a plurality of metal components and welding such components into said suspension member.

3. An improved method for manufacturing a suspension member, as set forth in claim 1, wherein said suspension member is prestressed by subjecting said suspension member to at least two repetitive applications of at least said operating maximum forces.

* * * * *